Patented May 24, 1938

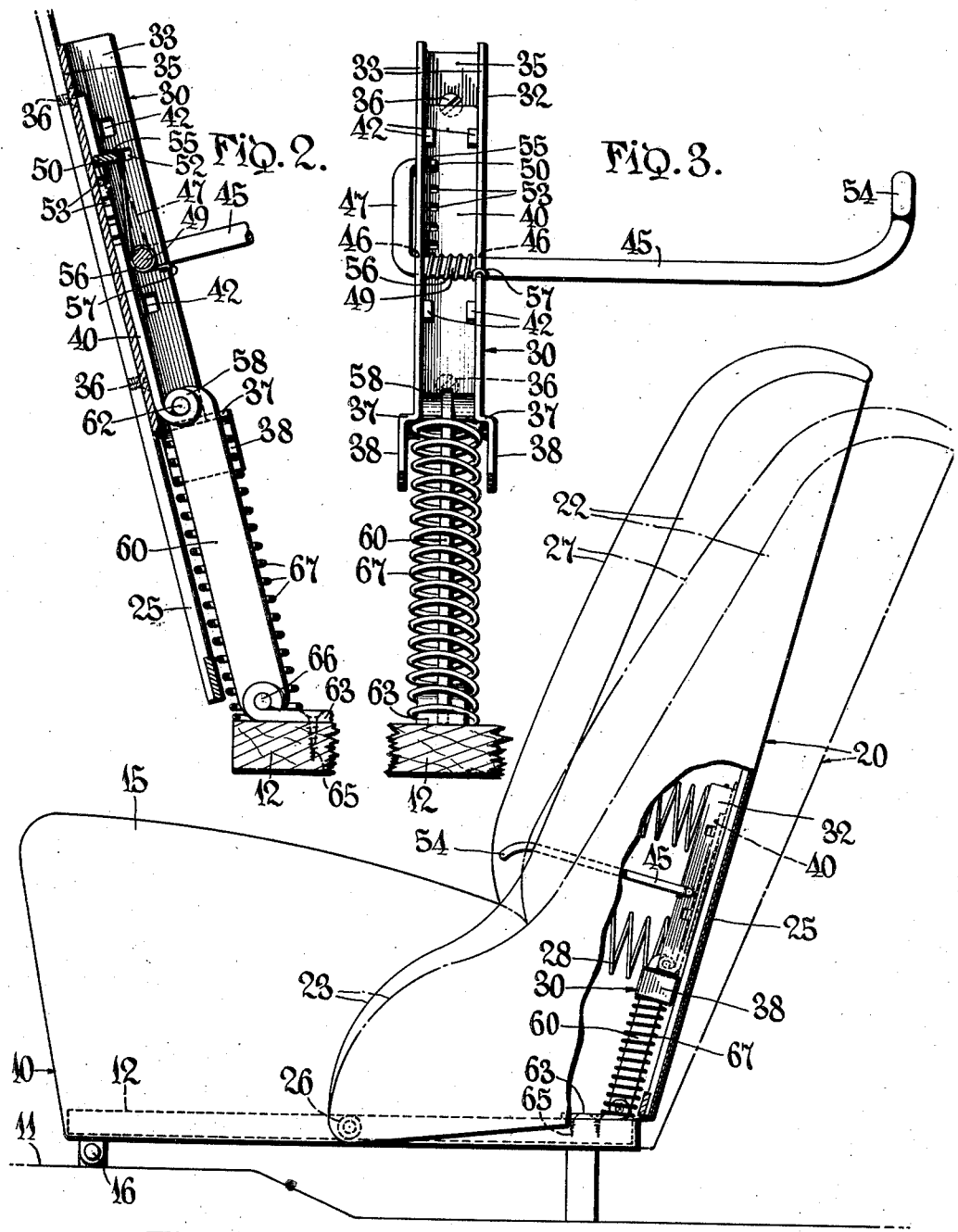

2,118,690

UNITED STATES PATENT OFFICE 2,118,690

SEAT BACK ADJUSTING DEVICE

Le Grand S. Whedon, Medina, N. Y.

Application October 22, 1935, Serial No. 46,216

1 Claim. (Cl. 155—162)

This invention relates to seat structure for installation in vehicles, or for other purposes, and it has particular relation to an improved structure for varying the relative positions of seat members.

One object of the invention is to provide an improved arrangement and relationship between a seat back and seat bottom, together with mechanism for selectively changing the relative positions of these members.

Another object of the invention is to provide an improved arrangement for mounting and controlling a seat back upon a seat bottom.

In arranging vehicle seat structure, it is desirable that the passengers carried in the vehicle shall be able to arrange the elements of the seating structure according to individual taste and without discomfort. A number of attempts have been made to provide a seating structure which will accommodate passengers of various physical characteristics and preferences in various positions which they may desire to assume, but considerable difficulty has been encountered in designing a structure which is suitable for the purposes specified and is also so simple and inexpensive as to be practical for use in less expensive vehicles, as well as in the expensive vehicles.

One of the primary advantages of this invention is exemplified in a seat installation which will be suitable for all types of passenger vehicles, and which is so simple and inexpensive as to add no appreciable cost to the manufacture of the vehicle as a whole. In other words, the invention can be incorporated in the vehicle of the present day type without additional cost, or for less cost than the ordinary installations.

In the drawing:

Fig. 1 is a side elevation of a seating structure in which the invention has been incorporated, and having portions broken away and shown in cross section for the sake of clearness;

Fig. 2 is a fragmentary vertical section, on a larger scale, of a seat back adjusting mechanism;

Fig. 3 is a front elevation of the adjusting mechanism shown in Fig. 2; and

Fig. 4 is a section through a modified form of adjusting mechanism.

In practicing the invention a seat bottom 10 is provided with a suitable support 11, which can be in the form of a vehicle floor, or other support, according to the type of structure in which the invention is to be installed, and this bottom includes a lower frame 12 supporting a seat cushion 15.

At the rear portion of the seat bottom 10, a frame or shell 20 composed of metal or other durable material, is formed with side flanges 22, forwardly projecting lower arms 23 and back frame 25. Suitable pivotal connections 26, carried by the seat bottom frame 12 at locations intermediate the forward and rearward portions of the seat bottom pivotally support the forward ends of the arms 23 of the shell and provide for forward and rearward swinging action of the back of the shell along a forward and upward arc from the rear of the seat bottom. A cushion 27, including conventional cushion springs 28, is mounted in the shell 20 to complete the seat back structure. Thus the seat back is bodily movable about the pivotal connections 26.

An adjusting device 30 for the seat back 20 is provided with a channel guide 32 secured rigidly in an upright position upon the back frame, 25. Side flanges 33 of the channel extend forwardly and the back or web 35 of the channel is provided with fastening elements 36 flush with the inner surface of the web 35 and rigidly securing the guide 32 with the seat back frame 25.

The lower portions of the side flanges 33 are bent outwardly in opposite directions to provide horizontal sections 37 disposed in substantially the same horizontal plane, and the end portions of these side flanges extend downwardly to provide shields 38. As best shown in Fig. 2, the sections 37 and shields 38 are wider than the body portions of the channel flanges to provide adequate area for purposes set forth below.

A flat, elongate slide 40 is slidably disposed in the channel 32 and is maintained therein by means of ears 42 struck out from the channel flanges 33 and bent over the marginal portions of the slide. A locking lever 45 is rotatably mounted in bearing openings 46 formed in the channel flanges 33, and the lever is provided with a rigid arm 47 bent at right angles to the lever bearing section 49. At the outer end of the arm 47 an angular finger 50 is provided for engagement with registering openings 52 and 53, such as slots, formed in the adjacent channel flange 33 and edge portion of the slide, respectively.

A handle portion 54 of the lever is provided to facilitate manual operation thereof. One end 55 of a spring 56 wound about an intermediate portion of the lever 45 rests upon the finger 50 and the other end 57 of the spring rests upon the outer edge of the other channel flange 33. Thus the spring constantly urges the finger 50 in the direction of engagement with one of the openings 53 in the slide to lock the latter.

The lower end of the slide 40 is provided with a bearing lug 58 in which a bar 60 is pivoted by means of a pivot pin 62. The pivotal connection is such that the seat back is free to pivot upon the connections 26. A bracket 63 secured rigidly, as indicated at 65, to the upper rear portion of the seat bottom frame 12 has a pivot pin 66 mounted therein to which the lower end of the bar 60 is pivoted.

One end of a coil spring 67 rests upon the brackets 63 and its other or upper end rests against the horizontal sections 37 of the channel flanges. The sections 37 are formed wider than the channel flanges 33 in order that the spring can have ample surface upon which to impinge, and the shields 38 protect the spring against possible buckling. The bar 60 is disposed through the coils of the spring 67 and the spring is normally under compression in such degree as always to exert a force tending to raise the rear of the seat back about the pivotal connections 26 of the arms 23. However, this spring is not sufficiently strong to interfere with movement of the back to its rearmost position by pressure exerted by a passenger leaning against the back.

Since the pivotal action of the seat back is provided about the connections 26 at intermediate portions of the seat bottom 10, any adjustment of the seat back moves all portions of the seat back cushion 27 against which the passenger rests forwardly or rearwardly, as the case may be, and changes the angle of inclination of the seat back, and the elevation of the upper and lower ends of the seat back. In the rearward position of the seat back, the rear portion of the seat bottom is disposed within the lower portion of the shell between the sides of the latter.

One of the important advantages of the invention resides in the fact that a passenger seated in the vehicle can adjust the seat back without moving from the seat merely by operating the handle or lever 54 and then leaning backwardly or forwardly, depending upon the direction in which adjustment is desired. After the handle 54 has been manipulated to release the finger 50 from one of the openings 53 of the slide, the coil spring 67 causes the seat back to follow the passenger as he leans forward to the desired position, i. e., when the passenger desires to have the back adjusted forwardly. The pivotal connections 26 are disposed medially of the seat bottom, and the rear portions of the seat bottom cushion 15 and the lower portion of the seat back cushion 27 substantially contact each other throughout their relative movement.

This condition is advantageous because the proper relationship between the seat back 20 and seat bottom 10 is retained regardless of the adjustment, and also the appearance of the seat structure, as a whole, is not marred by excessive separation of the junction portions of the cushions 15 and 27. The seating depth of the cushion 15 can thus be altered and, in the forward position of adjustment of the back for a small passenger, the arrangement not only places such passenger nearer the controls for the operating parts of the vehicle, but also at a higher elevation.

In Fig. 4 a different form of slide 80 is provided in the channel guide 32 and slides in the latter in substantially the same manner as the slide 40. However the slide 80 is of channel form, and hence, its side flanges 82 insure the slide more positively against bending. The operating parts in this arrangement function in substantially the same manner as those previously described and hence repetition of description is not necessary for proper understanding thereof.

Although comprehensive structures illustrating the invention have been shown and described in detail it will be apparent to those skilled in the art that the invention is not so limited, but that various changes can be made therein without departing from the spirit of the invention or from the scope of the appended claim.

I claim:

In a seat structure, a lower supporting member, a seat back having its lower portion pivotally supported on said member for forward and rearward tilting movement thereon, an upright channel guide carried rigidly by the seat back in spaced relation to the supporting member, a slide interfitting with and longitudinally movable upwardly and downwardly in said channel guide, said guide having flange portions overlapping the sides of the slide to hold the latter against lateral displacement, a link having its upper end portion connected to the lower end portion of the slide and extending from the lower end portion of the guide, means for pivotally supporting the lower end portion of the link on said supporting member, a coil spring normally under compression disposed about the link and having its opposite ends engaging said supporting member and the lower portion of the channel guide, and an adjusting lever extending rotatably through the sides of the channel guide and having means selectively engageable with recessed portions of the slide to permit forward and rearward tilting of the seat back and to secure the latter in adjusted positions.

LE GRAND S. WHEDON.